Aug. 7, 1956
M. J. WEST
2,757,708
APPARATUS FOR ASSEMBLING TRAVELING
LENGTHS OF WINDLACE COMPONENTS
Filed Jan. 12, 1952
3 Sheets-Sheet 1
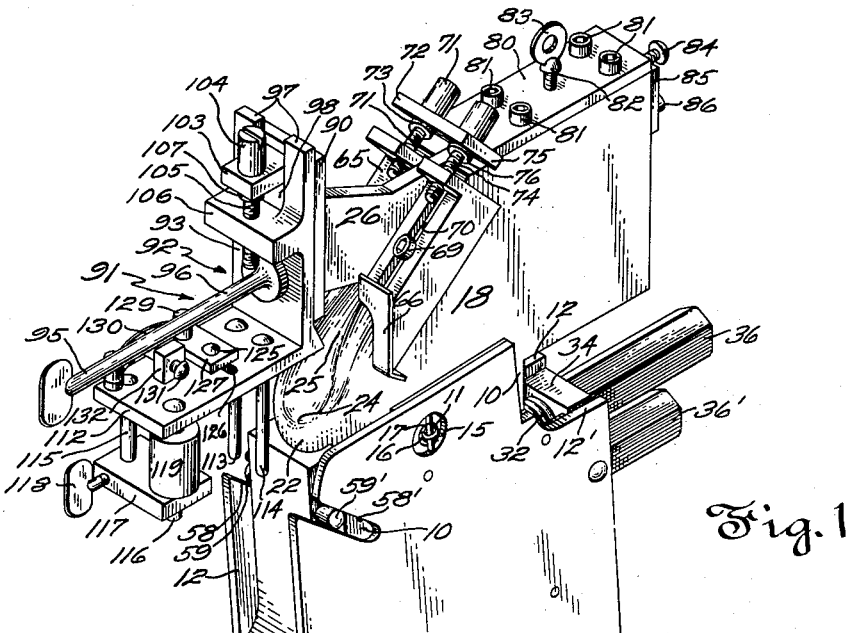
Fig. 1
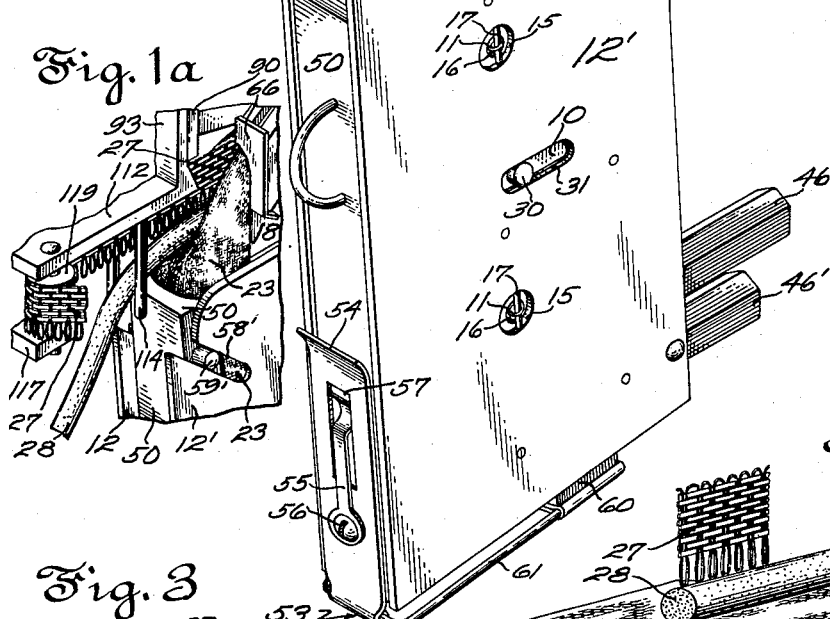
Fig. 1a
Fig. 2
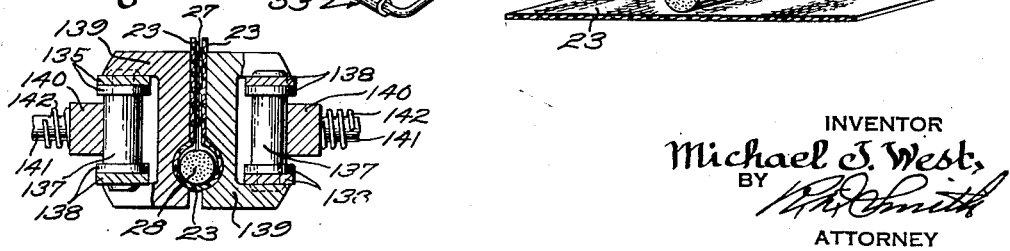
Fig. 3
INVENTOR
Michael J. West,
BY
ATTORNEY

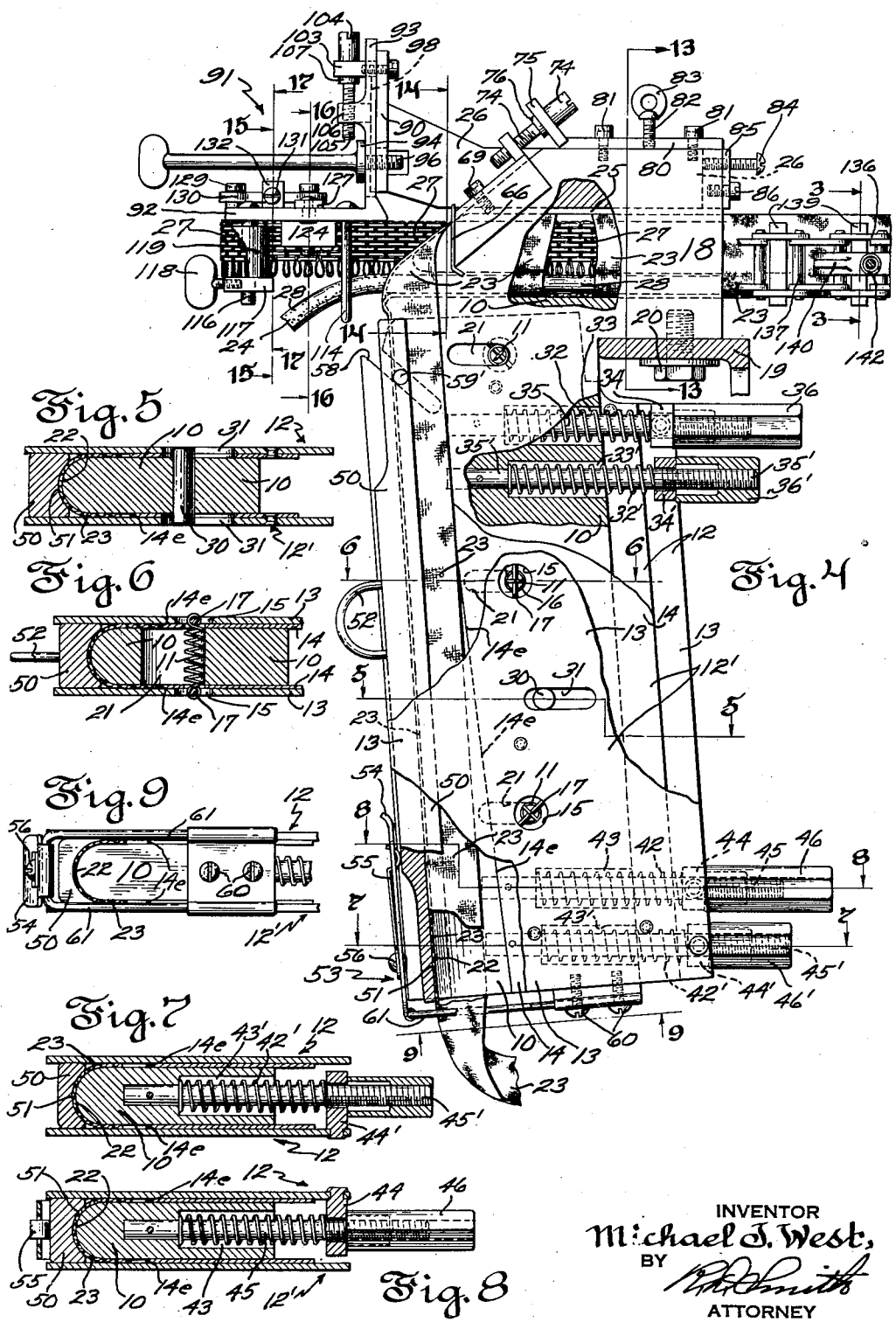

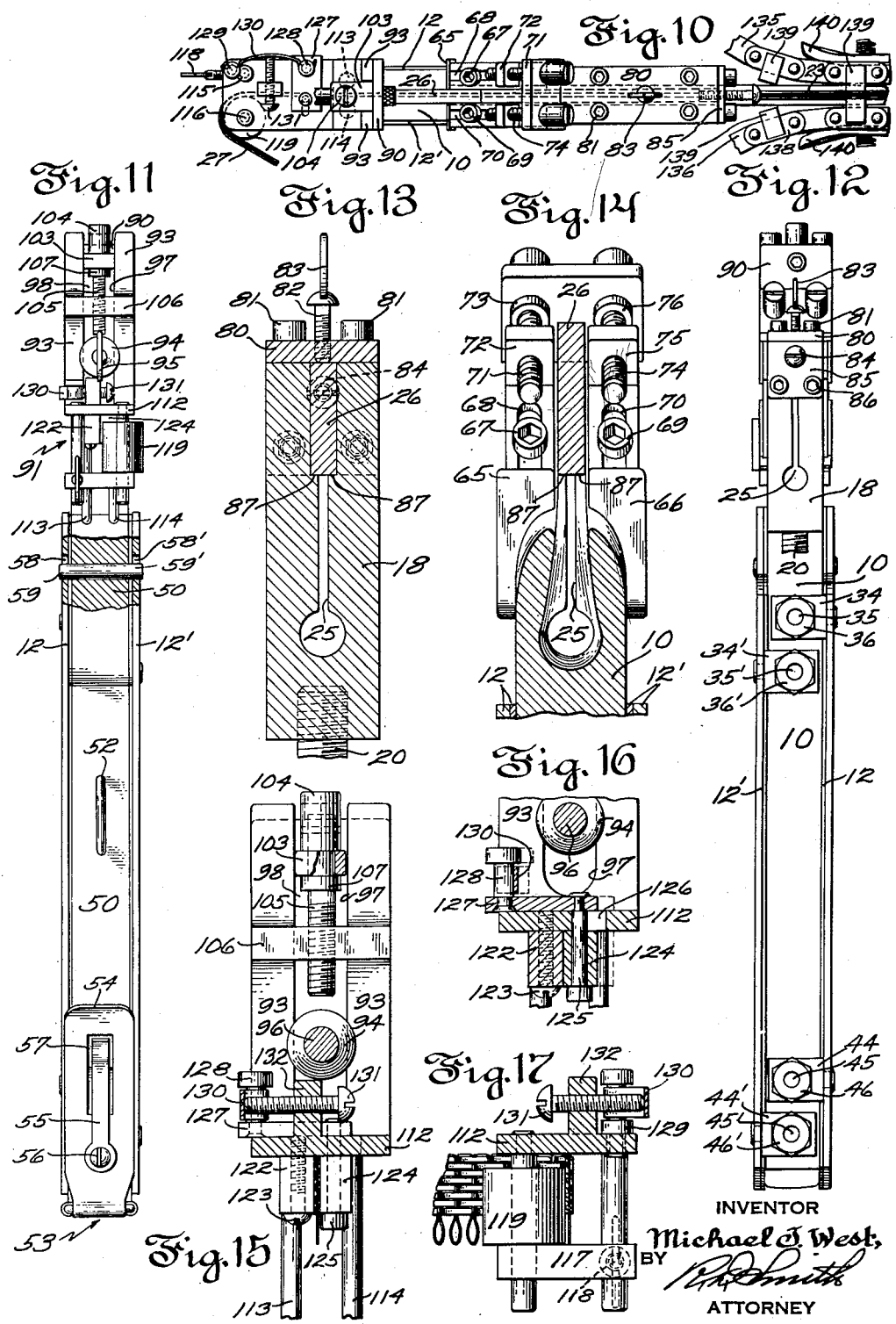

United States Patent Office 2,757,708
Patented Aug. 7, 1956

2,757,708

APPARATUS FOR ASSEMBLING TRAVELING LENGTHS OF WINDLACE COMPONENTS

Michael J. West, Shelton, Conn., assignor, by mesne assignments, to The B. F. Goodrich Company, Akron, Ohio, a corporation of New York Application January 12, 1952, Serial No. 266,224

13 Claims. (Cl. 154—1.8)

This invention pertains to work orienting apparatus for progressively assembling in a continuous fold of traveling flexible tape simultaneously traveling lengths of continuous flexible work materials such as the fastening fabric strip and beading cord of so called "windlace" or weather strip wherein the bead forming cord may be a strip of soft uncured sponge rubber composition of various cross sectional shapes later to be molded and vulcanized into permanent joinder with the fastening strip. Apparatus heretofore proposed for analogous purposes has failed dependably to insure a progressive coming together in designed relationship of continuous traveling lengths of flexible work materials such as those mentioned. This has been due in part to the softness and susceptibility to stretching of soft cord or strip of uncured sponge rubber compound, as well as to lack of firmness in laterally projecting loops of bare fine wire that form the anchoring selvedge of certain types of windlace fastening strips. Such failure has further been due to the tendency of a long traveling flexible tape to skew out of true alignment as it becomes flexed into a longitudinal fold or bight whereupon the tape edges fail to become properly aligned with each other as the folded traveling tape receives and cradles the traveling components of the windlace.

It is an object of this invention to provide fine and dependably regulated control of the assembled relationship in which continually traveling flexible elements come to be cradled within the longitudinal fold of traveling conveyor tape for transportation and processing in unison therewith.

A contributory object is to make available in the type of apparatus concerned selective cooperative adjustment of a considerable number of separate work guiding devices and controls which are capable of governing such variable factors as, the relative heights of the traveling work materials as they progress into mutual proximity, the relative directions in which the materials travel during their mutual approach, the relative friction, resistance or drag exerted on the traveling work at different points in the apparatus as the work is drawn therethrough, and the relative alignment of the edges of folded conveyor tape as it approaches and progressively cradles the traveling components of the windlace.

These and related objects of the invention will appear in greater particular from the following description of a successful embodiment of the improvements having reference to the accompanying drawings wherein:

Fig. 1 is an external isometric view of a work orienting apparatus embodying the present improvements, the work materials being absent.

Fig. 1a is a fragmentary view of the work materials entering the assembly channel of the apparatus of Fig. 1.

Fig. 2 is a sectional perspective view of separate work materials that may be assembled by the apparatus into the traveling relationship shown in Fig. 3.

Fig. 3 is a view on an enlarged scale taken in section on the plane 3—3 in Fig. 4.

Fig. 4 is a side elevation of the complete apparatus of Fig. 1 with certain parts broken away to expose details of construction and shows the work materials of Figs. 2 and 3 entering and leaving the assembly channel of the apparatus.

Figs. 5 through 8 are views taken partly in section in planes respectively designated by corresponding numerals in Fig. 4 looking in the directions of the arrows.

Fig. 9 is a fragmentary bottom plan view of the apparatus of Fig. 4.

Fig. 10 is a top plan view of the apparatus of Fig. 4.

Fig. 11 is a front edgewise view looking from the left at Fig. 4.

Fig. 12 is a rear edgewise view looking from the right at Fig. 4.

Figs. 13 through 17 are fragmentary views drawn on an enlarged scale taken partly in section on planes in Fig. 4 designated respectively by corresponding numerals, looking in the directions of the arrows.

The stationary body 10 of the apparatus comprises a solid, relatively thin block of inverted J-shape which may be cast or otherwise produced from suitable material such as aluminum. Block 10 is flanked by side plates 12 and 12' which are separated by the block and are pulled constantly toward each other against the side faces of the block as shown in Fig. 6 by a series of spring coils 11 spanning the space between the plates. These spring coils extend freely through and are bodily movable in elongate apertures 21 in block 10. Each of the side plates 12 and 12' is composite and comprises an external flat metal lamina 13 and an internal lamina 14 fixedly united therewith, the former in each plate having three relatively large clearance holes 15 and the latter in each plate lying slidably in contact with block 10 and having three relatively smaller respectively coaxial holes 16. The difference in diameter between holes 15 and 16 provides an annular recess in which cross pins 17 are lodged against lamina 14 while retained endwise by the edges of holes 15 in lamina 13. Cross pins 17 extend through and serve to anchor the end loops of spring coils 11. Plates 12 and 12' are thus individually shiftable edgewise in relation to each other and to the block 10 while urged into face to face frictional contact with the latter by the spring coils 11.

Block 10 extends a substantial portion of the full vertical height of the apparatus and has an offset integral head portion 18 by means of which the entire apparatus may be mounted removably on some machine frame support, represented at 19 in Fig. 4, by fastening means such as a bolt or bolts 20.

An upright edge 22 of block 10 is convexly rounded to form a vertical straight transversely crowned track along which a traveling tape 23 of tough flexible textile fabric initially slides upon entering the apparatus. Preferably tape 23 will be nonstretchable weave. At the top of track 22 the body block 10 forms a tape folding corner at 24 where track 22 is joined at approximately a right angle by an assembly channel 25 extending horizontally entirely through the block head 18. Such angle is sufficiently abrupt to afford an entrance to channel 25 for windlace components such as 27, 28 that is free and clear of the track 22 along which tape 23 approaches the folding corner 24.

Atop of channel 25 there is a mounting arm 26 that supports a work guiding unit 91 hereinafter to be more particularly described. Arm 26 is firmly and releasably held in block head 18 so as to be withdrawable therefrom when desired to facilitate threading new lengths of work materials into channel 25.

The ability of plates 12 and 12' to be adjustably shifted edgewise relatively to block 10 is partially restricted by a cross pin 30 fixedly lodged in and projecting from the sides of block 10, and whose ends engage and are pivotally slidable in slots 31, respectively, in the side plates. Plates 12 and 12' can be rocked edgewise independently about pin 30 as a fulcrum for adjustive shifting of the front upright edges or tape baffles 14e, 14e, of the inner plate laminae 14, 14, relatively to the track 22. The purpose of so adjusting the lamina edges 14e, 14e, is to position them to serve as guide ways for baffling lateral straying of the edges of the upward traveling tape 23, while these tape edges ride freely in the narrow space between block 10 and the outer laminae 13, 13 of the side plates 12, 12'.

For permitting and maintaining adjustments of lamina edges 14e, 14e, a spring coil 32 is confined under axial tension between the inner end of a cavity 33 in block 10 and a stationary lug 34 fixed on side plate 12. A companion spring coil 32' is under axial tension between the inner end of a cavity 33' in block 10 and a stationary lug 34' fixed on side plate 12'. Spring coil 32 loosely surrounds a threaded stud 35 that is fixed in block 10 and which projects therefrom loosely through a clearance hole in lug 34 to receive a draw nut 36 in threaded engagement therewith. Spring coil 32' loosely surrounds a threaded stud 35' that is also fixed in block 10 and projects therefrom loosely through a clearance hole in lug 34' to receive a draw nut 36' in threaded engagement therewith. Another spring coil 42 is confined under axial tension between the inner end of a cavity 43 in block 10 and a stationary lug 44 fixed on side plate 12. Spring coil 42 loosely surrounds a threaded stud 45 that is fixed in block 10 and projects therefrom loosely through a clearance hole in lug 44 to receive draw nut 46 in threaded engagement therewith. A companion spring coil is confined under axial tension between the inner end of a cavity 43' in block 10 and a stationary lug 44' fixed on side plate 12'. Spring coil 42' loosely surrounds a threaded stud 45' that is also fixed in block 10 and projects loosely through a clearance hole in lug 44' to receive draw nut 46 in threaded engagement therewith.

Since all threads on studs 35, 35' and 45, 45' are right hand threads, the clockwise turning of draw nuts 36 and 36' in Fig. 12 will advance the upper extent of the edges 14e, 14e of inner plate laminae 14, 14 toward the crown of track 22 or to the left in Fig. 4, while corresponding clockwise turning of draw nuts 46 and 46' in Fig. 12 will advance the lower extent of track edges 14e, 14e of inner plate laminae 14, 14, respectively, toward the crown of track 22 or to the left in Fig. 4. Fig. 4 shows an adjustment of draw nuts 36, 36', 46, 46' such that the lower extent of track edges 14e, 14e are spaced from the edges of tape 23 but slant toward the crown of track 22 as they extend upwardly whereby they merge into position to contact with the traveling edges of tape 23 about midway the height of the apparatus as shown in Figs. 4, 7, 8, 5 and 6. Upon backing off the draw nuts by turning them counterclockwise in Fig. 12, the spring coils 32, 32', 42, 42' will expand lengthwise and force the plate carried lugs 34, 34', 44, 44' toward the right by keeping them always in close abutting contact with the draw nuts, thus acting to retract the lamina edges 14e, 14e away from the crown of track 22 or toward the right in Fig. 4 to accommodate greater widths of tape 23.

For most dependable control of the tape travel along track 22 a removable cover clamp 50 is provided having the form of a rigid elongate bar whose transversely concave face 51 conforms to the convex edge of track 22. Clamp 50 can be removed from and restored to its working position shown in Figs. 1 and 4 by means of a loop handle 52 fixed thereon. The bottom end portion of the clamp is yieldably retained in its illustrated working position by a resilient angle bracket 53 one end of whose horizontal branch is fastened fixedly against the bottom edge of block 10 at 60 and whose upright arm flanks and is spaced from the track edge 22 of block 10. The aforesaid horizontal branch of bracket 53 comprises rods 61 spaced apart to afford room therebetween for the tape 23 to ride upwardly into the apparatus. The top end of bracket 53 is lipped outward at 54 to facilitate entrance of the bottom end of cover clamp 50 into the space between the same and block 10. A leaf spring 55 is secured on the outer face of bracket 53 by a mounting screw 56. The curved free end of spring 55 projects through an aperture 57 in bracket 53 thereby to engage and exert a friction producing pressure against clamp 50 assisting to retain it against displacement by forces such as the frictional drag of the upward traveling tape 23 which somewhat tends to lift the cover clamp from its position in Fig. 9. In Fig. 1, it is seen that the cover clamp 50 is further removably constrained at its top end by the engagement with diagonal notches 58 and 58' in side plates 12 and 12' of the projecting ends respectively of cross studs 59 and 59' fixedly projecting from the cover clamp. Thus a traveling tape 23 as shown in Fig. 4 is lightly squeezed between the concave face 51 of cover clamp 50 and the convex track edge 22 of block 10 by the bias of the former toward the right as its weight produces a yielding tendency of studs 59, 59' to slide downward and rearward or toward the right in Fig. 4 in the slanting notches 58, 58'.

By the means so far described the behavior of the tape as regards tendency to skew can be finely controlled as it is drawn upward between clamp 50 and track 22 with the tape edges maintained equidistant from the center of the track by constraint of edges 14e, 14e of the plate laminae 14, 14'. This has been found to solve the troublesome problem of insuring that the tape shall ride into proper registering relation with the tape folding corner 24 of block 10.

The side walls of block head 18 that flank channel 25 taper downward as they approach the folding corner 24 and carry two tape edge deflectors 65 and 66 that are alike and mounted to be slidably adjustable independently along the slanting top edges of the channel flanking walls. Deflector 65 is lockable in its adjustable positions by the head of a fastening screw 67 whose shank extends loosely through an elongate slot 68 in the deflector and into threaded engagement with the block head 18. Companion deflector 66 is likewise secured in adjustable positions by the head of a fastening screw 69 whose shank extends loosely through elongate slot 70 in the deflector and into threaded engagement with the block head 18.

Adjustment of deflector 65 along the channel edge can be finely effected by a pushing and pulling screw 71 that is freely turnable in a clearance hole in stationary abutment 72, in relation to which it is held from axial movement by the slotted head of the screw and by a thrust collar 73 fixed on the shank of the screw at the opposite side of abutment 72. Screw 71 has threaded engagement with deflector 65 so that as the screw is turned freely in abutment 72 it pushes or pulls on the deflector in the direction of the axis of the screw. Fine adjustment of deflector 66 along the channel edge is accomplished by a pushing and pulling screw 74 freely turnable in a clearance hole in stationary abutment 75 in relation to which it is withheld from axial movement by the slotted head of the screw and by a thrust collar 76 fixed on the shank of the screw at the opposite side of abutment 75. Screw 74 has threaded engagement with deflector 66 so that as the screw is turned freely in abutment 75 it pushes or pulls on the deflector in the direction of the axis of the screw.

Abutment 72 is integral with a roof plate 80 which spans the channel 25 and is permanently secured to the block head 18 by bolts 81. Centrally of roof plate 80 there is a vertical set screw 82 having a wing handle 83 and which extends through the roof plate in threaded engagement therewith projecting inward toward channel 25. Screw 82 seats against the top edge of mounting arm 26 of the work guiding unit 91 and forces the arm downward against its seat on ledges 87 in channel 25. An adjustable limit for the horizontal position of arm 26 is established by an end screw 84 that threads through a cross plate 85 permanently fastened to block head 18 by bolts 86. Arm 26 is thus removable from the open top of channel 25 by loosening set screw 82 and pulling the arm outward toward the left in Fig. 4.

The external end of mounting arm 26 carries an upright head flange 90 that serves as a vertical supporting way for a work guiding unit herein designated 91 as a whole. Unit 91 comprises a subframe 92 in the form of a rigid angle iron whose upright branch 93 is clamped against the outside surface of head flange 90 by means of a thrust shoulder 74 fixed on the elongate head 95 of a horizontal clamping screw 96. This screw extends freely through an elongate aperture 97 in the subframe upright 93 and has threaded engagement with the head flange 90 of mounting arm 26. When clamping screw 96 is loosened, the work guiding unit 91 is free to be shifted upward and downward on the head flange 90 and is guided to shift in a straight path by the snug sliding fit of aperture 97 in upright 93 with a stationary key 98 fixed on the front surface of the upright branch 93 of subframe 92.

At the top end of key 98 a stationary lug 103 projects fixedly forward from the head flange 30 containing a clearance hole in which is freely turnable a vertical pushing and pulling screw 105 that has threaded engagement with a lug 106 on the upright branch 93 of the subframe. A thrust collar 107 fixed on the shank of the screw 105 cooperates with the head 104 of the screw to prevent axial movement of screw 105 through lug 103, wherefore the turning of screw 105 will pull upward or push downward on the work guiding unit 91 for effecting a fine adjustment of its vertical alignment with work assembly channel 25.

Fixedly depending from the horizontal branch 112 of the subframe 92 there are four rigid posts designated 113, to 116, inclusive. Posts 113 and 114 are bare while posts 115 and 116 serve as holding guides for a foot bar 117 having two holes that are a sliding fit on the posts 115 and 116. Bar 117 is maintained at selected heights on the posts by a set screw 118 to accommodate different widths of windlace fastening strip 27. One or both of posts 115, 116 may afford pivotal support for a pulley 119 about which is entrained the traveling continuous length of the windlace fastening strip. While such strip may be of many kinds, that herein shown for purposes of illustration is described in greater particular in U. S. patents, Nos. 2,459,120 or 2,299,955.

Also depending from the bottom face of the horizontal branch 112 of subframe 92 is a guide block 122 fixedly secured to the latter by screws 123 so as to take the lateral thrust of a pressor shoe 124. This shoe has an upstanding stud 125 that extends through a transversely elongated slot 126 in the subframe branch 112 with a fit permitting it to slide freely therein. Above the horizontal branch 112 of the subframe, stud 125 is fixedly connected to a slide 127 that carries an upstanding spring anchorage stud 128. A corresponding spring anchorage stud 129 upstands fixedly from the horizontal branch 112 of the subframe. The space between studs 128, 129 is spanned by a yoke spring 130 whose free ends are curved to hook against studs 128 and 129 respectively. An adjustable degree of squeezing tension on the traveling windlace fastening strip 27 can be set up in pressor shoe 124 by the variable pressure exertable on spring 13 by the spring backing screw 131 having threaded engagement with a lug 132 that upstands fixedly from the horizontal branch 112 of subframe 92.

The bare depending posts 113, 114 guide and permit to pass freely therebetween the traveling soft beading cord 28 of the windlace components which may be uncured blowable sponge rubber compound with lubricated surface. This converts the approach of the latter into joinder with the windlace fastening strip 27 in the fold of carrier tape 23 to a direction of alignment with channel 25 at the tape folding corner 24 of the apparatus as shown in Fig. 1a.

In Figs. 3, 4 and 10 there is represented one of many well known impelling means capable of drawing the beaded wnidlace components 27, 28 in unison with the cradling tape 23 through the apparatus. As it is of little concern with this invention how near the right or outlet end of channel 25 such impelling means may operate, or whether or not the tape that bears the windlace is to be drawn through additional processing apparatus after leaving channel 25 before being grasped and impelled by such means, only a simple example of impelling means is herein sketchily illustrated. In Figs. 3, 4 and 10, 135, 136 represent parallel stretches of ordinary endless bicycle chain riding about spaced sprocket wheels (not shown). The spaced apart rollers 137 of these chains are pivotally coupled in overlapping relation by the usual flat side links 138. Certain links carry clamp members 139 having a work fitting surface contoured to accord with the cross sectional shape of the folded tape containing the windlace beading cord 28 and fastening strip 27 as shown in Fig. 3. Fig. 10 indicates that as the chains approach each other, after passing around their sprockets, they cause the clamp members 139 to come together and travel in unison as they press toward each other and against the broadside outer surfaces of tape 23. The clamping pressure of members 139 against tape 23 can be augmented by the constraint of stationary presser rails 140 acting as floating tracks along which the rollers 137 ride. The shanks 141 of presser rails 140 can be slidably constrained in framework (not shown) rigid with the machine support 19, and the tracks can be constantly urged toward each other by spring coils 142 surrounding strips 141 and under axial compression between the framework of the machine and the pressor rails 140.

In threading up the apparatus with a new line or work material, the arm 26 and its carried unit 91 is removed from the head 18 of block 10 after loosening set screw 82. The cover clamp 50 also is removed by pulling it upward and out of engagement with plate notches 58, 58' and the retainer bracket 53. A free end of tape 23 can then be pulled upward between bracket support arms 61 along the convex track edge 22, then flexed over the folding corner 24 and then passed through channel 25 until it can be reached at the delivery end of the channel and pulled lengthwise through the apparatus.

Next the plate lamina adjusting nuts 36, 36', 46, 46' will be turned to bring the lamina edges 14e into guiding accord with the edges of whatever width of tape has been chosen for the job to be run, and the tape edge deflectors 66 will be correspondingly adjusted to suit the overall width of the tape 23 so that the tape edges will properly be caused to reverse their direction of flexing just after the tape passes over the folding corner 24 of block head 18. The tape can then be clutched and drawn continually through the apparatus by the power driven traveling clamps 139. While the tape is thus being caused to travel refining adjustments of the individual draw nuts 36, 36', 46, 46' and of the individual tape edge deflectors 66 will be made experimentally with or without cover clamp 50 in place until the tape becomes properly oriented thereby to ride through the apparatus with the center line of its bight coincident with the longitudinal center line of the tape at the center of the crown on track 22 thereby insuring that the tape edges will register evenly with each other as the tape leaves the channel 25.

The mounting arm 26 of unit 91 can then be reinserted in block head 18 and held therein by tightening the set screw 82 to serve as a roofing closure over the channel 25. Next the fastening strip 27 of the windlace will be drawn from a supply roll (not shown) and passed at least part way around roller 119 and then clamped yieldably between friction guides 122 and 124 as shown in Fig. 15. The strip will then be threaded between depending guide posts 113, 114 into the fold of tape 27 at the point of entrance to channel 25 which is fully cleared and exposed to receive the windlace fastening strip because of the downward angular departure of track 22 from the direction in which channel 25 extends. The proper frictional resistance to keep strip 27 taut can be produced by turning the clamp spring tensioning screw 131.

While thus conveyed through and out of the channel 25 while sandwiched between the upstanding sides of the tape 23, fastening strip 27 will be squeezed between these tape sides as the latter become clutched by the traveling impelling clamps 139. Relative longitudinal movement between tape 23 and fastening strip 27 is thereby inhibited so that all work materials will be drawn through the apparatus in unison.

Finally the entering end of the soft cord 28 of sponge rubber compound that is to expand and vulcanize to become the sponge rubber beading of the windlace is introduced into the space within the bight of traveling tape 23 just beneath the wire loop selvedge of the woven fastening strip 27 so that the beading cord becomes conveyed by the traveling tape in unison with and in this relation to the fastening strip. To insure that cord 28 will approach its point of joinder with the tape and fastening strip in a direction of alignment with the travel of the latter, the cord passes between the guide posts 113 and 114. The distance of these guide posts from the folding corner 24 of block 10 can be varied to suit the size and performance of the materials entering the apparatus by adjustably sliding the mounting arm of unit 91 to the left or right in block head 18 in Figs. 1, 1a and 4 while the height of this unit in relation to channel 25 can be adjusted to suit the vertical width of fastening strip 27 by adjustably raising or lowering the angle fixture 92 on the head flange 90 of mounting arm 26.

With the foregoing various means of adjustment at hand, the operator can adapt a work orienting apparatus embodying these improvements so as to assemble within conveying tapes of various widths and characteristics of flexure, various sizes and shapes of beading and of fastening strips for making many different kinds of windlace from a considerable choice of components.

Because the principles of this invention can be embodied in many variations of mechanical detail, the appended claims are directed to and intended to cover all fair equivalents of the particular structures and their relationships herein disclosed that are new and heretofore unknown to workers in this art.

I claim:

1. In work orienting apparatus for progressively assembling traveling lengths of windlace components within a continuous fold of traveling flexible tape, a body block of relatively thin dimension having two edges meeting end to end in approximately perpendicular relation thereby to form a fold reversing corner, said block edges and corner forming a continuous track along which said tape is adapted to slide, one of said block edges being transversely convex to impart an initial direction of transverse curvature to said tape and the other of said block edges being transversely concave to impart an ultimate reverse direction of transverse curvature to said tape, the said corner having contours causing the shape of said convex edge to merge smoothly into the shape of said concave edge thereby to convert said initial tape curvature to said ultimate tape curvature as the tape slides over said corner.

2. In work orienting apparatus as described in claim 1, the combination with the said body block of, a cover clamp removably mounted on said block so as to press yieldingly against the said convex edge of said block, and a roofing closure removably mounted on said block in position to bridge the hollow of the said concave edge of said block, whereby the tape is retained in sliding contact with said block edges as it travels therealong.

3. In work orienting apparatus as described in claim 1, the combination with the said body block of, plates at the sides of the block each having a marginal portion flanking and sufficiently spaced from the said convex edge of said block to accommodate and guide therebetween the edges of a traveling tape, at least one of said plates being shiftable edgewise relatively to said block, and means to set and hold said shiftable plate in selective edgewise relation to said convex edge of the block to form passageways for the edges of tapes of various widths.

4. Work orienting apparatus for progressively assembling traveling lengths of windlace components within a continuous fold of traveling flexible tape, comprising a relatively thin stationary frame body, an elongate transversely crowned straight approach track extending along an edge of said body disposed to receive and be wiped lengthwise by the traveling tape and terminating in a tape folding corner of said body, and a rigid channel for receiving and guiding the tape and windlace components combined formed by fixedly spaced apart stationary side walls of said body leading away from said folding corner at a substantial angle to said track.

5. Work orienting apparatus as defined in claim 4, together with impelling means engaging said tape at the opposite end of the said channel from the said folding corner in a manner to draw the tape lengthwise along said track and about said folding corner thence into and through said channel.

6. Work orienting apparatus as defined in claim 5, together with work orienting structure in front of the said channel entrance including work orienting guides defining a pathway for a traveling length of windlace components disposed in straightway alignment with said channel and in angular relation to the said approach track.

7. Work orienting apparatus as defined in claim 4, in which the said track comprises a tape wiped face that is transversely convex, together with an elongate cover having a transversely concave face conforming to and substantially coextensive in length with said convex face of said approach track in a manner to flex the said flexible tape into a transversely bowed shape as it travels along said track between the latter and said cover.

8. Work orienting apparatus as defined in claim 7, together with a deflector stationed on each side of the said channel at an obtuse angle to the path of approaching travel of the respectively opposite edges of the said transversely bowed tape thereby to divert said edges from a path of travel imparting to said tape one transversely bowed shape into a different path of travel imparting to said tape a reversely bowed shape.

9. Work orienting apparatus as defined in claim 4, in which the said assembly channel is flanked by two side walls located in the path of travel of the said tape to be traversed thereby on its way into the said assembly channel and that progressively increase in height as they extend away from a point of mergence with said folding corner, thereby to form slanting top edges on said side walls, together with a deflector stationed on said slanting top edge of each side wall in position to limit the longitudinal extent of said side walls that can be traversed by said tape.

10. Work orienting apparatus as defined in claim 9, in which the said deflectors are releasably fastened on the said side walls of the channel in a manner to be adjustably shiftable along the said slanting top edges thereof.

11. Work orienting apparatus as defined in claim 4, in which the said track comprises a central body of U-shaped cross-section affording a crowned edge of said body, and external side plates flanking said body spaced from the sides thereof sufficiently to permit the edges of the tape to ride along said track while tracking between the said body and said plates.

12. Work orienting apparatus as defined in claim 11, together with a guide for the edges of the tape comprising baffles occupying the said spaces between the said body and the said side plates.

13. Work orienting apparatus as defined in claim 12, in which the said side plates are adjustably shiftable edgewise relatively to the said body, and the said baffles are fixed on said side plates to be movable therewith in relation to the said crowned edge of said body, thereby to enable the position of said baffles to be shifted by edgewise shifting of said side plates for accommodating tapes of varying width.

References Cited in the file of this patent

UNITED STATES PATENTS

| | | |
|---|---|---|
| 1,671,042 | Mix | May 22, 1928 |
| 1,808,582 | Taylor | June 2, 1931 |
| 1,834,554 | Taylor | Dec. 1, 1931 |
| 2,028,494 | Blanchet | Jan. 21, 1936 |
| 2,191,646 | Doyle | Feb. 27, 1940 |
| 2,309,093 | Borden | Jan. 26, 1943 |
| 2,528,718 | Bertrand | Nov. 7, 1950 |

FOREIGN PATENTS

| | | |
|---|---|---|
| 330,549 | Italy | of 1935 |